United States Patent
Sasaki et al.

(10) Patent No.: US 6,170,373 B1
(45) Date of Patent: Jan. 9, 2001

(54) CIRCULAR SAW HAVING MOVEMENT PREVENTION MEANS

(75) Inventors: Katsuhiko Sasaki; Yoshinori Shibata, both of Anjo (JP)

(73) Assignee: Makita Corporation, Anjo (JP)

( * ) Notice: Under 35 U.S.C. 154(b), the term of this patent shall be extended for 0 days.

(21) Appl. No.: 09/228,978

(22) Filed: Jan. 12, 1999

(30) Foreign Application Priority Data

Jan. 12, 1998 (JP) .................................................. 10-004077

(51) Int. Cl.[7] .................................................. B23D 19/00
(52) U.S. Cl. .............................. 83/485; 83/581; 83/471.3; 83/DIG. 1
(58) Field of Search ..................... 83/581, 468.3, 83/468.7, 471, 472, 473, 451, 468.6, 471.3, 490, 485, 487, DIG. 1, 399

(56) References Cited

U.S. PATENT DOCUMENTS

| | | | |
|---|---|---|---|
| 3,123,108 | * 3/1964 | Gaskell et al. | 83/471.3 |
| 4,869,142 | * 9/1989 | Sato et al. | 83/581 |
| 5,054,352 | * 10/1991 | Fushiya et al. | 83/468.3 |
| 5,060,548 | * 10/1991 | Sato et al. | 83/468.3 |
| 5,421,228 | * 6/1995 | Fukinuki | 83/581 |
| 5,437,214 | 8/1995 | Sasaki et al. | |
| 5,564,323 | * 10/1996 | Sasaki et al. | 83/581 |
| 5,660,094 | * 8/1997 | Sasaki et al. | 83/581 |
| 5,819,624 | * 10/1998 | Brault et al. | 83/581 |
| 5,957,021 | * 9/1999 | Meredith et al. | 83/473 |

FOREIGN PATENT DOCUMENTS

| | | |
|---|---|---|
| 3329496 | 3/1985 | (DE) . |
| 4123435 | 1/1992 | (DE) . |
| 19632229 | 3/1997 | (DE) . |
| 19743498 | 4/1998 | (DE) . |

* cited by examiner

Primary Examiner—Rinaldi I. Rada
Assistant Examiner—Omar Flores-Sánchez
(74) Attorney, Agent, or Firm—Dennison, Scheiner, Schultz & Wakeman

(57) ABSTRACT

A circular saw includes a table for placing a workpiece thereon, a saw unit having a circular saw blade mounted thereon, and a support mechanism for supporting the saw unit on the table, so that the saw unit is movable in forward and rearward directions. A lock device includes a lock member that is movable between a first position and a second position. In the first position, the lock member permits the saw unit to move in both forward and rearward directions. In the second position, the lock member prevents the saw unit from moving in one of the forward and rearward directions.

13 Claims, 15 Drawing Sheets

CIRCULAR SAW HAVING MOVEMENT PREVENTION MEANS

FIELD OF THE INVENTION

The present invention relates to circular saws, for example, circular saws having a saw unit that has a circular saw blade and is vertically and horizontally movable relative to a workpiece to be cut. In particular, various means for preventing forward or rearward movement of the saw blade during a cutting operation are taught.

DESCRIPTION OF THE RELATED ART

In order to cut a workpiece using a circular saw in a "chop cutting mode," the saw unit is slidably moved rearwardly away from the operator by pushing the saw unit in a horizontal direction relative to a table, so that the saw unit is positioned forward adjacent the workpiece. The saw unit is then pressed downwardly toward the table to cut the workpiece. However, because the circular saw blade of the saw unit is positioned forwardly of the workpiece and rotates downwardly rearward relative to the workpiece during the cutting operation, a reaction force is applied to the saw unit in a direction forward toward the operator, as a result of rotating saw blade contacting the workpiece. For this reason, the operator is required to apply an additional force in the rearward direction to counteract this reaction force. Consequently, the operator may become fatigued during such chop cutting operations.

SUMMARY OF THE INVENTION

Therefore, an object of the present invention to provide improved circular saws.

In particular, circular saws are taught that have means for preventing the saw unit from moving in one of either the forward or rearward directions during the cutting operation. Preferably, the circular saw is not permitted to move in the forward direction in which a reaction force, generated by the rotating circular saw blade contacting the workpiece, is applied Thus, the saw unit is not moved by the reaction force applied from the workpiece and the operator is not required to apply a counteract force to the saw unit to hold the saw unit in position against this reaction force. Therefore, the operability of the circular saw can be improved and the burden on the operator can be reduced.

Other objects, features and advantages of the present invention will be readily understood after reading the following detailed description together with the accompanying drawings and the claims.

DETAILED DESCRIPTION OF THE INVENTION

Figure 1:
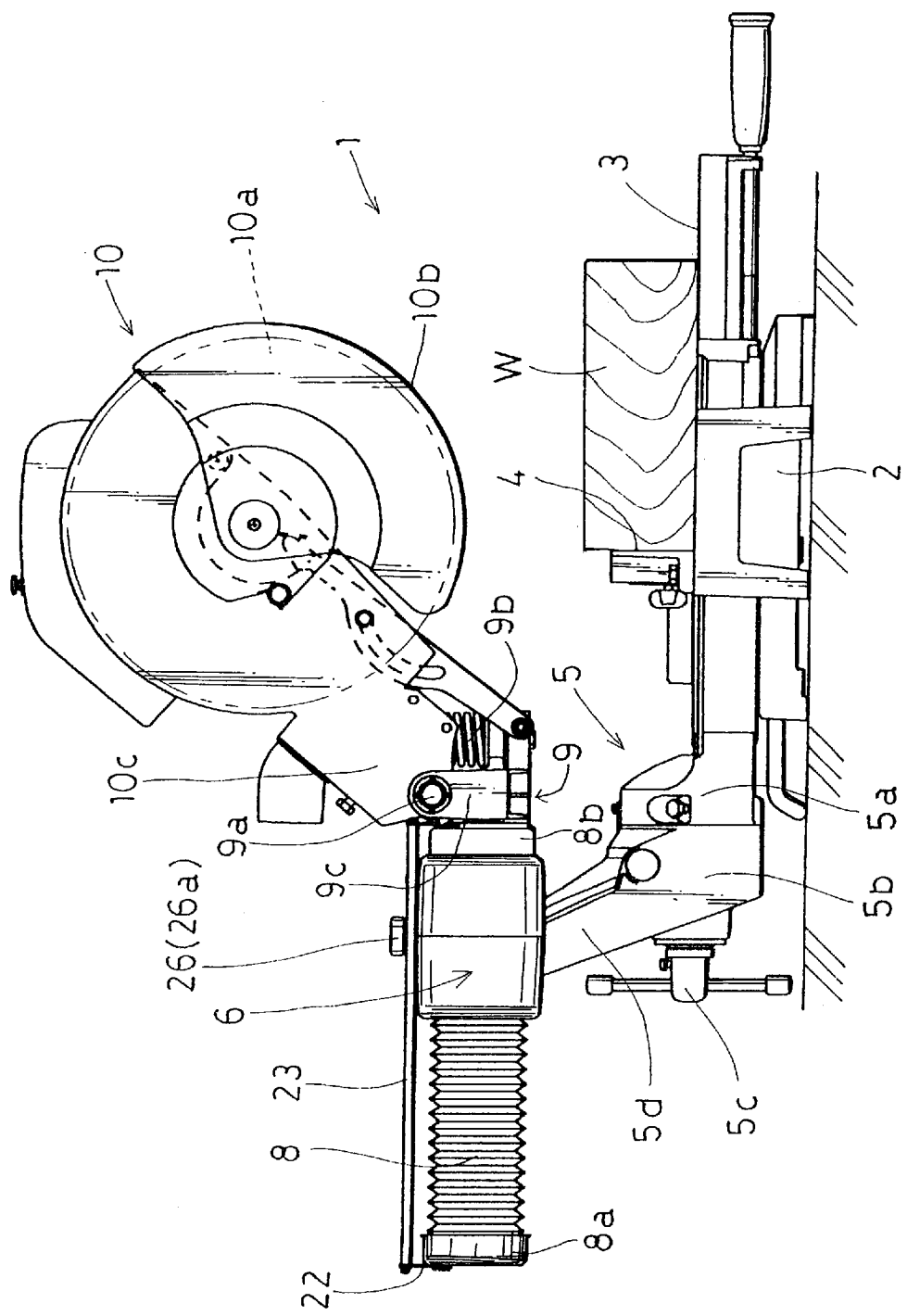
FIG. 1 is a side view of a circular saw according to a first representative embodiment.
Figure 2:
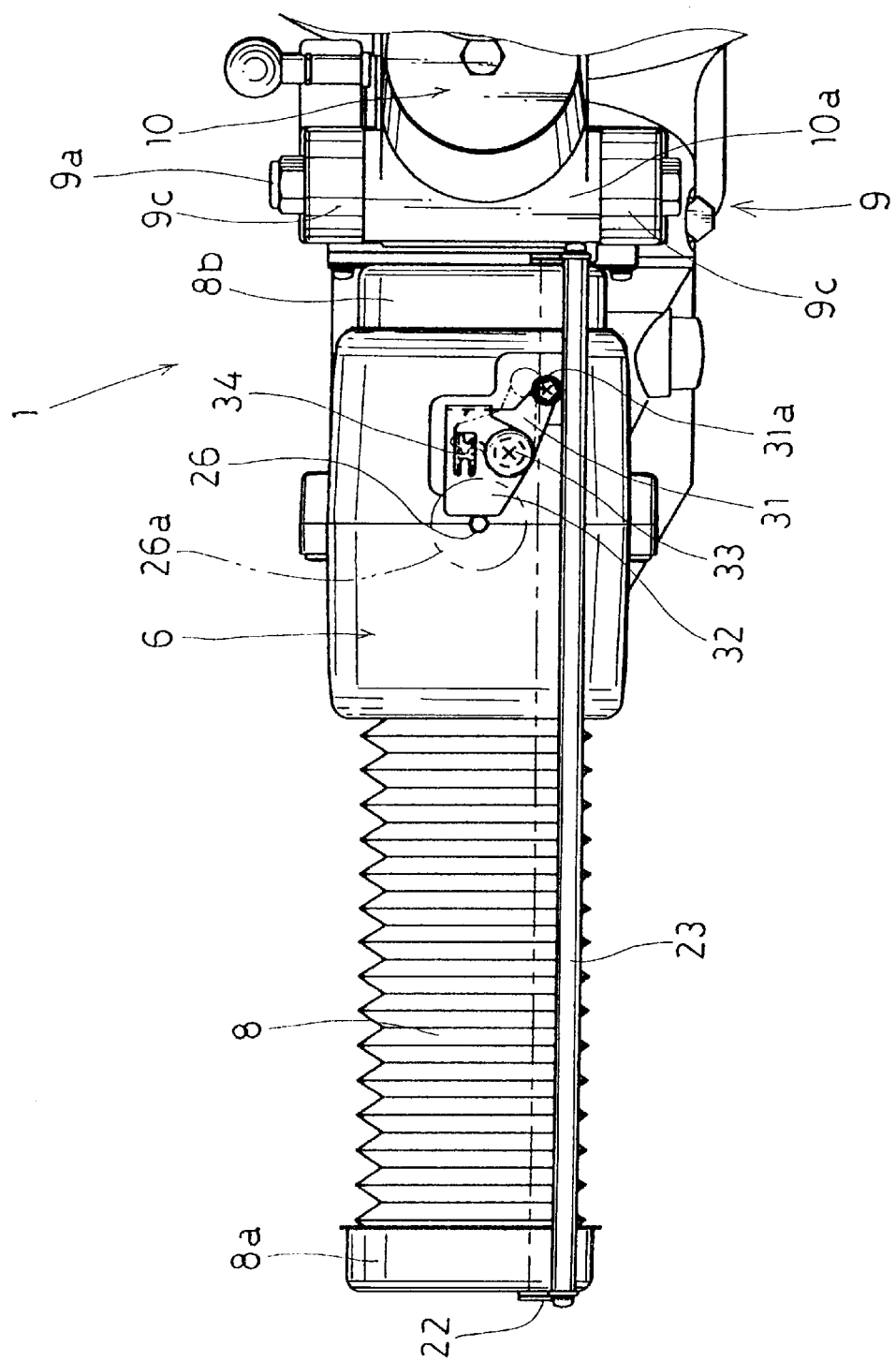
FIG. 2 is a plan view of a slide support device of the circular saw of FIG. 1.

Accordingly, circular saws are taught having lock means, or other appropriate means for preventing the horizontal movement of the circular saw blade during a chop cutting operation. Preferably, the means for preventing horizontal movement includes a lock member that is movable between a first position and a second position. In the first position, the lock member permits the saw unit to move in both forward and rearward directions. In the second position, the lock member prevents the saw unit from moving in one of either the forward or rearward directions during the cutting operation. In particular, the lock means prevents the saw unit from moving the forward direction in which the reaction force is applied from a workpiece.

Thus, the saw unit will not be moved by the reaction force applied from the workpiece, and therefore, the operator is not required to apply an additional force to the saw unit to hold the saw unit in position against this reaction force.

As described further in the representative embodiments, the lock means may be operable to move the lock member from the first position to the second position in response to the downward movement of the saw unit. Thus, the lock means may automatically operate to prevent the saw unit from moving in one of the forward and rearward directions.

The lock member may be held in the first position until the saw unit reaches a predetermined height or position. Thus, the lock member can be moved or shifted from the first position to the second position when the saw unit is moved below or past the predetermined height or position.

The lock means also may include a mechanical interlocking means for transmitting the downward movement of the saw unit to the lock member as the movement from the first position to the second position.

Alternatively, the lock means may include a sensor and an actuator. The sensor may detect the downward movement of the saw unit. The actuator can then move or shift the lock member from the first position to the second position based on an output signal generated by the sensor.

The lock means may be incorporated into circular saws that have support means for supporting the saw unit on a table, so that the saw unit can be moved in forward and rearward directions and that the saw unit can be moved in a vertical direction.

The support means may, for example, include a slide bar, a slide support device for supporting the slide bar, and a pivotal support device. The slide support device can be utilized to permit the slide bar to move in both forward and rearward directions relative to the table. The pivotal support device can be utilized to vertically pivotally support the saw unit on the slide bar.

The lock member preferably is pivotable about a pivotal axis and has an abutting surface. The abutting surface may be substantially spaced apart from the slide bar when the lock member is in the first position. On the other hand, the abutting surface may abut the slide bar in a position away from the pivotal axis in one of the forward and rearward directions when the lock member is in the second position.

The lock member may be a ring having an inner surface with a diameter that is greater than an outer diameter of the slide bar. The pivotal axis can be positioned substantially on an axis of the slide bar, and the abutting surface may include front and rear ends of the inner surface of the ring.

Preferably, an operation member, such as a knob that is operable by an operator is provided to move the ring to a third position. In the third position, the inner surface of the ring may abut the slide bar in a surface-to-surface contact relationship therewith so as to prevent the slide bar from moving in both forward and rearward directions.

The ring also can be replaced by a substantially rectangular lock plate that is pivotally mounted on the slide support device.

The support means may further include a support arm that is mounted on the table so as to extend upwardly from the table. The saw unit can be vertically pivotally mounted on one end of the slide bar by means of the pivotal support device. The interlocking means may include an engaging member movable with the saw unit, a pivotal member mounted on the slide support device and pivotal about a first axis that is parallel to the axis of the slide bar, and a rotary member that is mounted on the slide support device and can be rotated about a second axis that is substantially perpendicular to the axis of the slide bar. With this construction, the movement of the engaging member in the downward direction can be translated into the pivotal movement of the pivotal member and can be subsequently translated into the rotational movement of the rotary member, which rotational movement is transmitted to the lock member.

The slide support device of the support means can be disposed below the table in one embodiment of the present teachings. In this embodiment, the pivotal support device may include a support arm that extends upward from one end of the slide bar. The saw unit may be vertically pivotally mounted on one end of the support arm by means of the pivotal support device. The interlocking means preferably includes a rotary member and a wire. The rotary member may be mounted on the slide support device and may be rotated about an axis that is substantially perpendicular to the axis of the slide bar. The wire may connect the rotary member to the saw unit. With this construction, the movement of the saw unit may be transmitted to the rotary member by means of the wire and can then be transmitted to the lock member.

Each of the additional features and method steps disclosed above and below may be utilized separately or in conjunction with other features and method steps to provide improved circular saws, and methods for making the same.

Representative examples of the teachings of the present invention, which examples utilize many of these additional features and method steps, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative and preferred embodiments of the invention.

Therefore, particularly preferred embodiments of the present invention will now be described in further detail with reference to the drawings.

FIGS. 1 to 11 show a circular saw 1 according to a first detailed representative embodiment. The circular saw 1 includes a base 2 and a turntable 3. The turntable 3 is mounted on the base 2 and can be rotated relative to the base 2. A fence 4 is mounted on the base 2 and extends across the turntable 3 from a right side portion to a left side portion of the base 2. The fence 4 serves to determine the position of a workpiece W to be cut.

A slide support device 6 is mounted on a rear side of the turntable 3 via a pivotal support device 5. The pivotal support device 5 includes a support member 5a and a pivotal member 5b. The support member 5a is fixedly mounted on the rear end of the turntable 3. The pivotal member 5b is pivotal relative to the support member 5a in right and left directions. A handle 5c can be rotated to fix the pivotal member 5b in position relative to the support member 5a and to release the pivotal member 5b from the support member 5a. Thus, by rotating the handle 5c in one direction for releasing the pivotal member 5b, the pivotal member 5b can be pivoted either rightward or leftward relative to the support member 5a by a desired angle. The pivotal member 5b can be fixed in such a pivoted position by rotating the handle 5c in the opposite direction, so that a "miter cutting operation" can be performed in which the saw unit 10 is inclined laterally relative to the turntable 3. In this case, the pivotal axis of the pivotal member 5b extends within a horizontal plane from which an upper surface of the turntable 3 extends.

Figure 3:
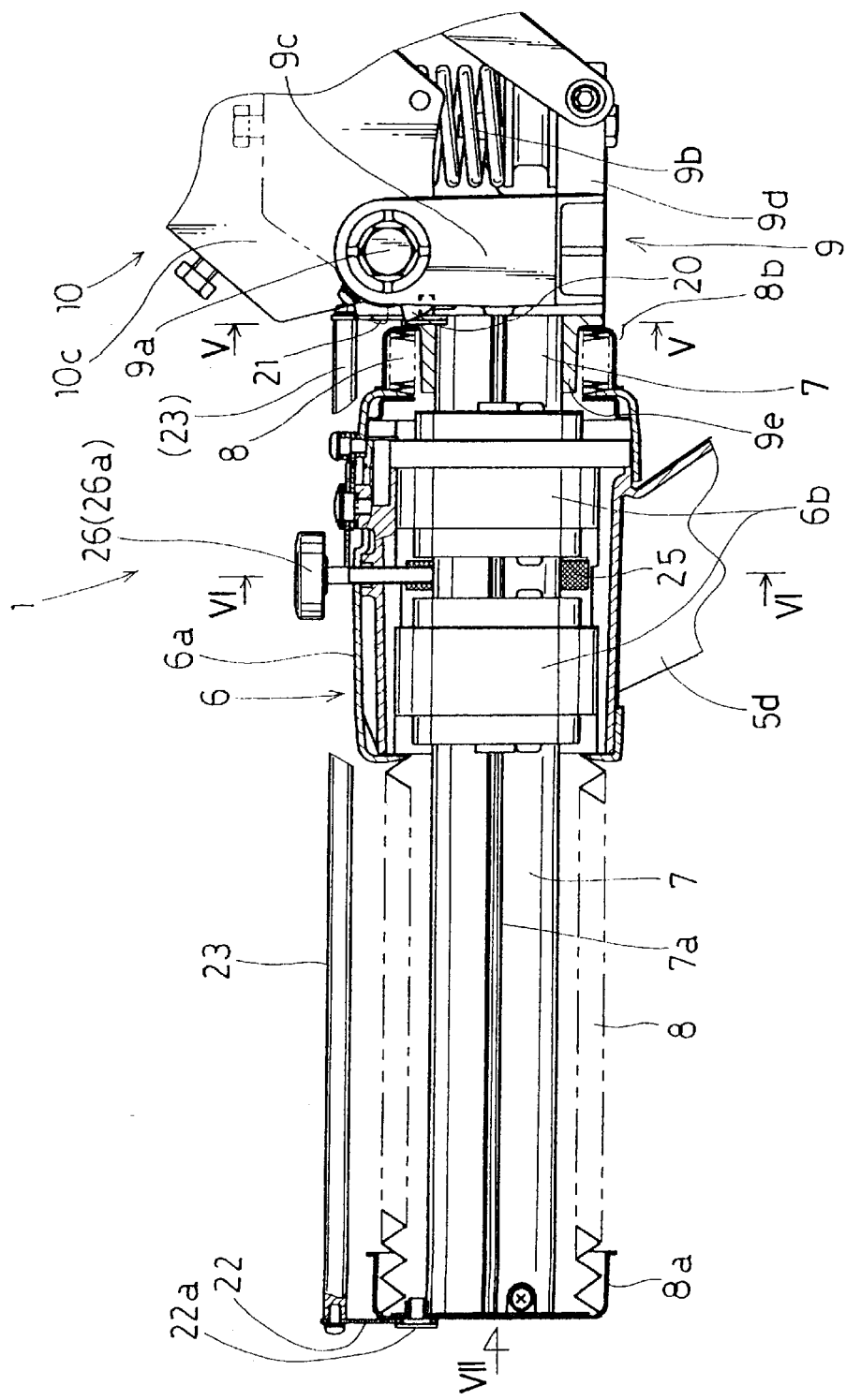
FIG. 3 is a vertical sectional view of FIG. 2.
Figure 4:
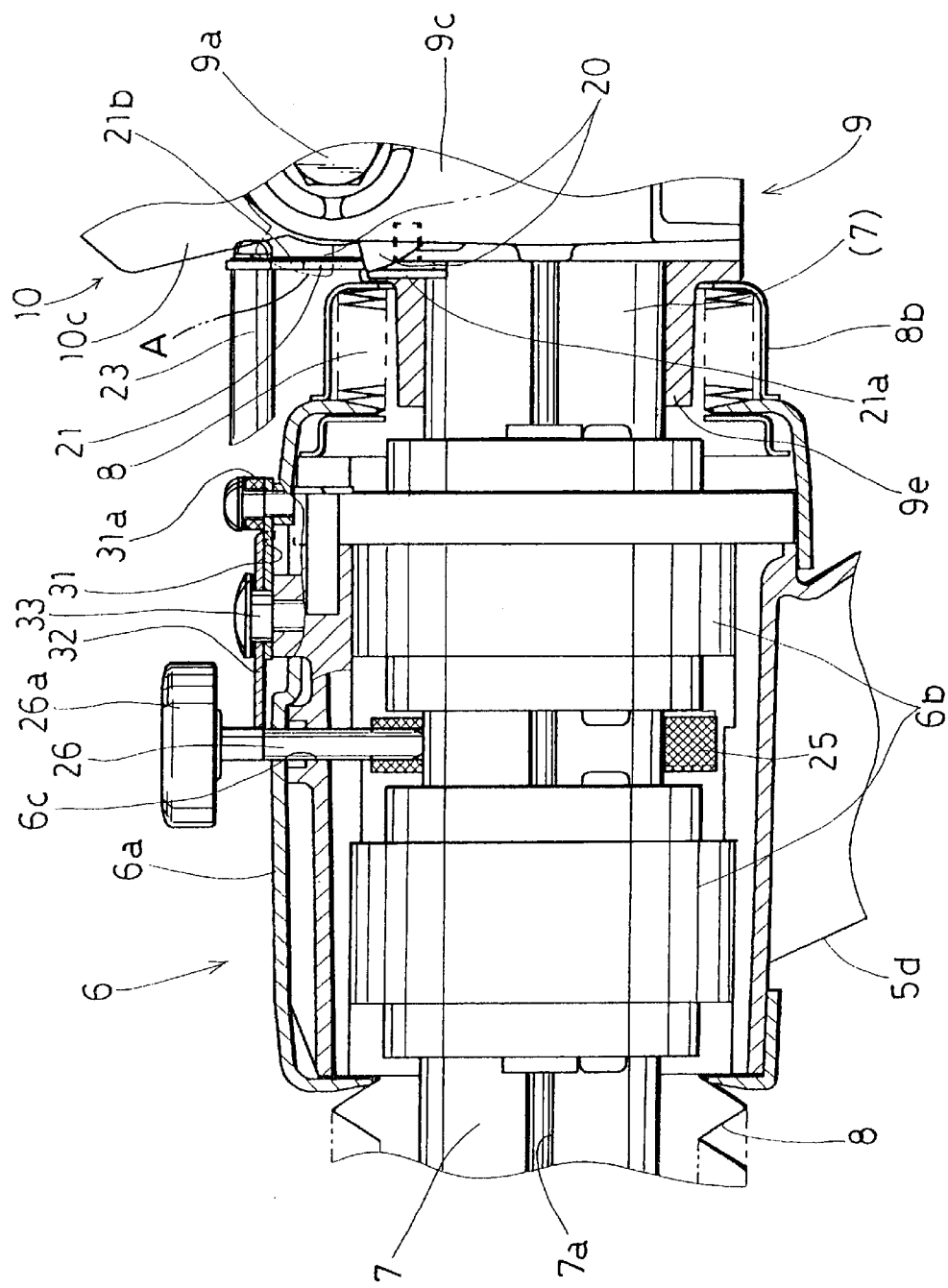
FIG. 4 is an enlarged view of certain relevant parts of the slide support device shown in FIG. 3.

The pivotal support device 5 further includes an arm 5d that extends upwardly from the pivotal member 5b. The slide support device 6 is mounted on the arm 5d and includes a cylindrical casing 6a that is secured to the upper end of the arm 5d. A pair of ball bearings 6b are disposed within the casing 6a as shown in FIGS. 3 and 4. A slide bar 7 is inserted into the bearing 6b and extends therethrough, so that the slide bar 7 is axially slidably supported by the casing 6a by means of the bearings 6b.

Figure 5:
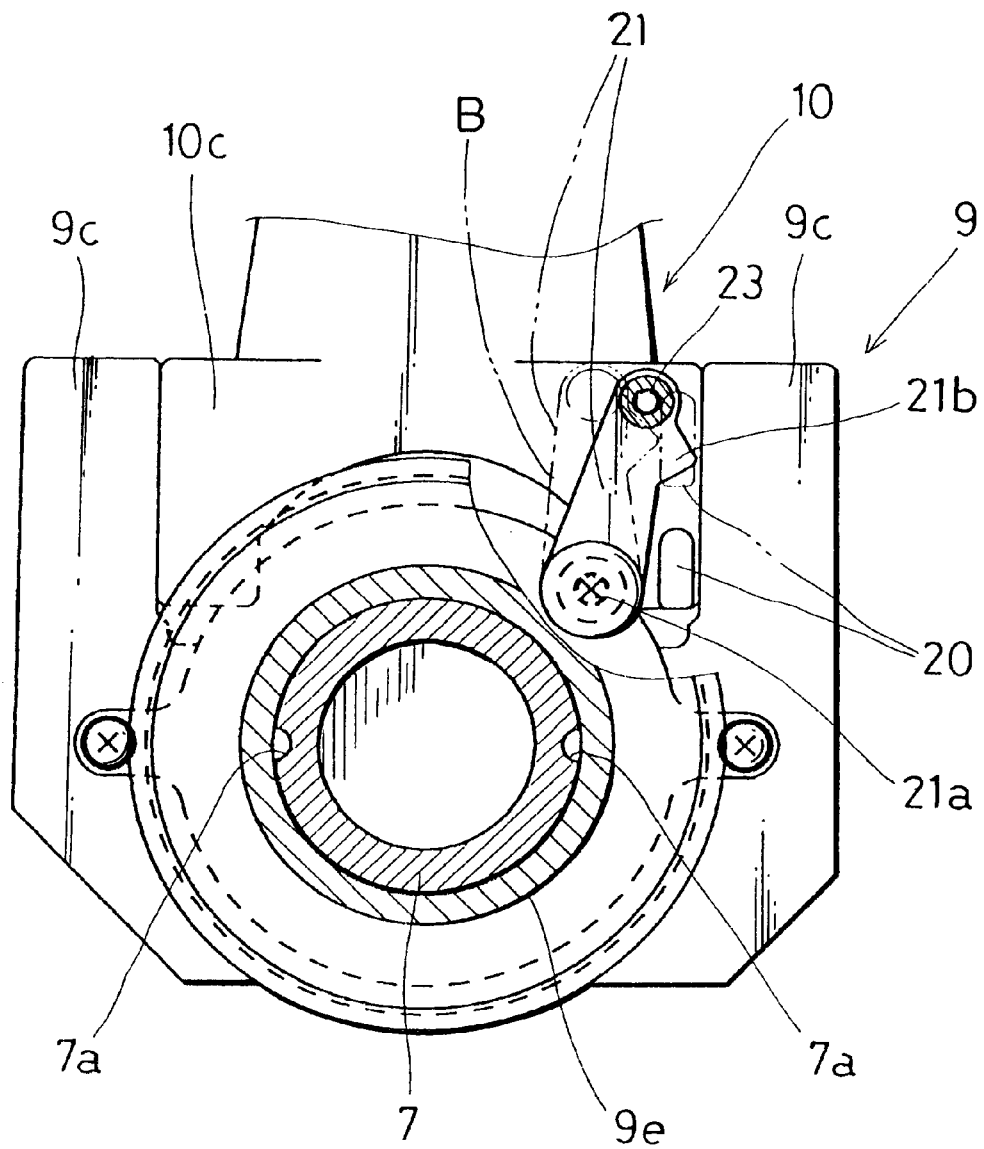
FIG. 5 is a sectional view taken along line V—V in FIG. 3.
Figure 6:
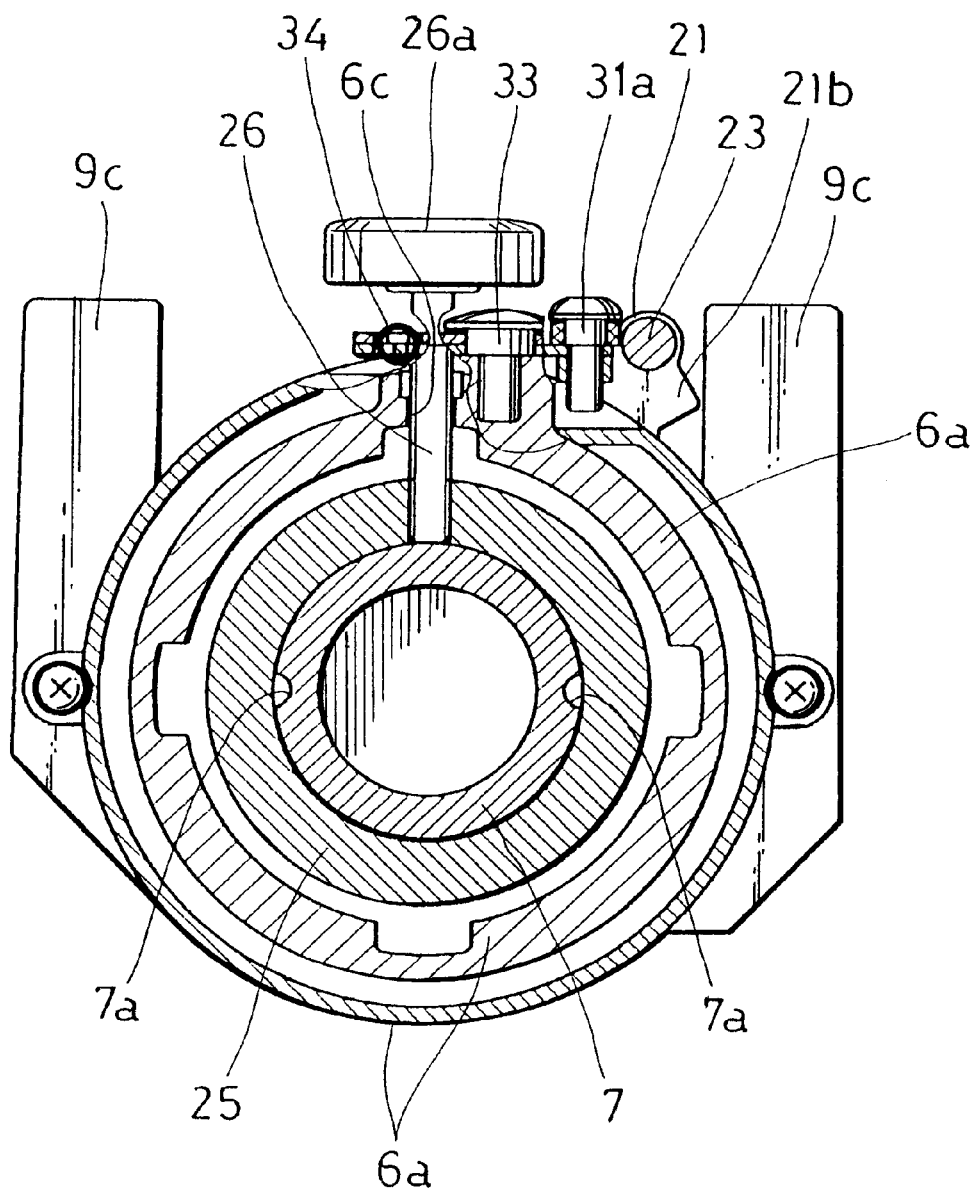
FIG. 6 is a sectional view taken along line VI—VI in FIG. 3.
Figure 7:
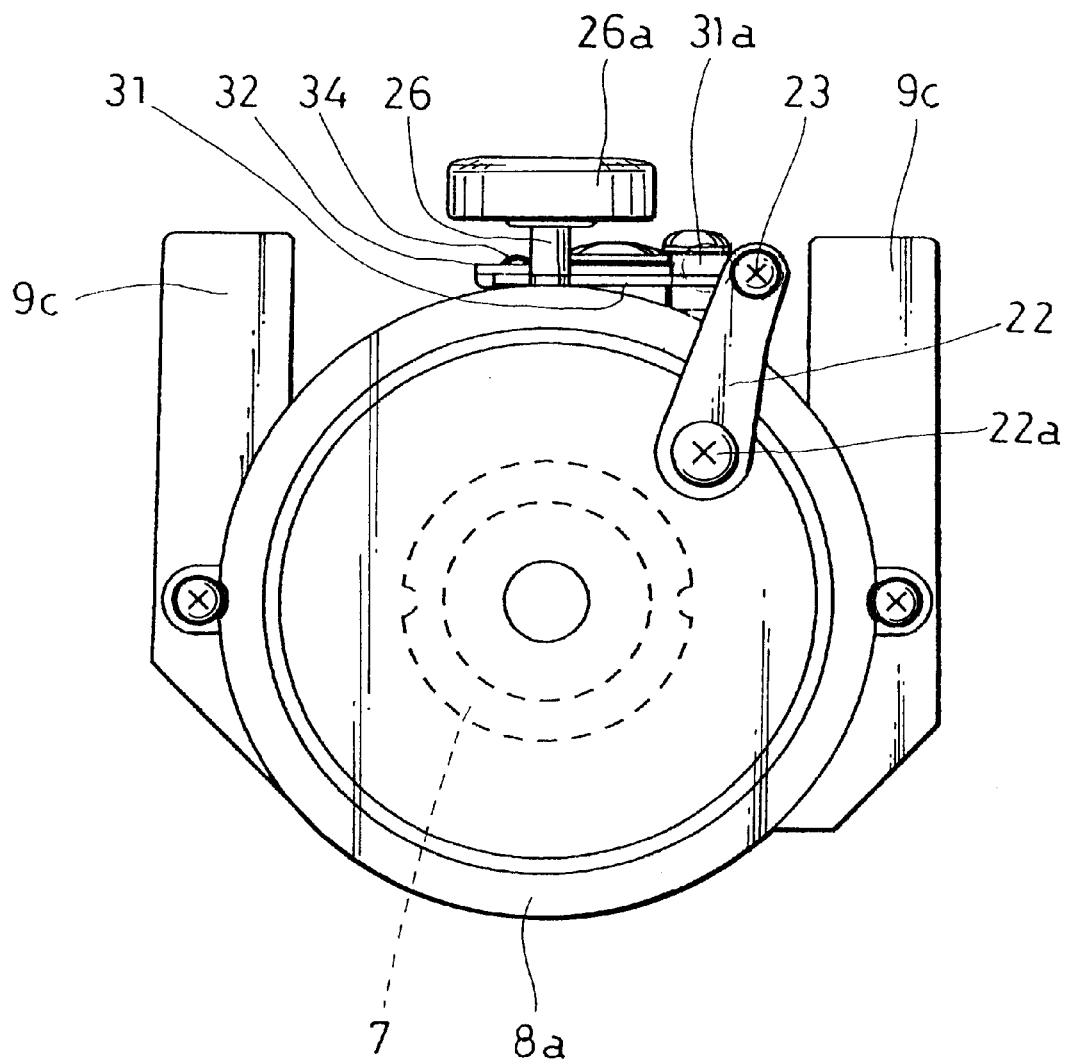
FIG. 7 is a rear view as viewed in the direction of arrow VII in FIG. 3.

As shown in FIGS. 5 and 6, a pair of spline recesses 7a are formed in the slide bar 7 at diametrically opposing positions and extend in the axial direction of the slide bar. In addition, bearing balls (not shown) of the bearings 6b engage the spline recesses 7a and therefore prevent the slide bar 7 from rotating about its axis or from rotating relative to the casing 6a. Thus, the slide bar 7 and the bearings 6b constitute a ball spline. Referring back to FIG. 1, a pair of bellows 8 are fitted over the slide bar 7 between the rear end of the slide bar 7 and the rear end of the casing 6a and between the front end of the slide bar 7 and the front end of the casing 6a, respectively. Therefore, the slide bar 7 is not directly exposed to the outside environment.

A vertical pivotal support device 9 is disposed on the front end of the slide bar 7. As shown in FIGS. 3 and 4, the support device 9 includes a cylindrical member 9e, a base member 9d and a pair of lugs 9c. The cylindrical member 9e is fitted on and secured to the front end of the slide bar 7. The base member 9d is secured to the front side of the cylindrical member 9e. The lugs 9c are secured to and extend upwardly from the base member 9d. The support pin 9a extends between the lugs 9c and through a rear side 10c of the saw unit 10 that is inserted between the lugs 9c. Therefore, the saw unit 10 is vertically pivotal about the support pin 9a. A compression spring 9b is interposed between the base member 9d and the rear side 10c of the saw unit 10 so as to bias the saw unit 10 upwardly.

One of the bellows 8 that is positioned on the front side has an end cap 8b fitted on the cylindrical member 9e.

The saw unit 10 has a circular saw blade 10a that is rotatably driven by an electric motor (not shown). The lower half of the saw blade 10a is substantially covered by a saw cover 10b that is movable to uncover the saw blade 10a in response to the downward pivotal movement of the saw unit 10.

With the above construction, the saw unit 10 is vertically pivotable by means of the vertical pivotal support device 9 and is horizontally slidable in the forward and rearward directions by means of the slide support device 6. Thus, when the operator presses the saw unit 10 downwardly against the biasing force of the compression spring 9b, the saw blade 10a is brought into contact to cut the workpiece W placed on the turntable 3. The workpiece W also can be cut from the front side (right side as viewed in FIG. 7) by positioning the saw unit 10 forward (rightward as viewed in FIG. 1) of the workpiece W and by pushing the saw unit 10 rearward against the workpiece W. In such case, the saw unit 10 is held in the downward pivoted position.

The circular saw 1 of this embodiment may preferably include a slide movement prevention means for preventing the saw unit 10 from moving in the forward direction when the saw unit 10 has been lowered below a predetermined height. A representative slide movement prevention means will now be explained.

As shown in FIG. 4, an engaging projection 20 is formed to extend from the rear side 10c of the saw unit 10. The engaging projection 20 can be moved with the saw unit 10 along an arc path about the support pin 9a as indicated by the dotted lines A in FIG. 4.

As shown in FIGS. 4 and 5, a pivotal member 21 is mounted on the cylindrical member 9e of the vertical pivotal support device 9 by means of a support pin 21a. A catch projection 21b is formed on one lateral surface of the outer end of the pivotal member 21. When the saw unit 10 is pivoted downward, the engaging projection 20 is moved upwardly along the arc path, so that the engaging projection 20 abuts the catch projection 21b. Therefore, the pivotal member 21 pivots in the counterclockwise direction about the support pin 21a as indicated by dotted lines B in FIG. 5.

Referring back to FIGS. 1 and 2, a pivotal member 22 is pivotally mounted on the end cap 8a positioned on the rear end of the bellows 8. However, the pivotal member 22 does not include the catch projection 21b as is provided on the pivotal member 21 that is positioned on the front side. A joint bar 23 is connected between the outer ends of the pivotal members 21 and 22 and extends in the horizontal direction. Therefore, the pivotal member 22 pivots together with the pivotal member 21 and with the joint bar 23. Thus, when the saw unit 10 is pivoted downward below a predetermined height or position, the engaging projection 20 abuts the catch projection 21b, so that the joint bar 23 pivots upwardly as viewed in FIGS. 2 and 8.

Figure 10:
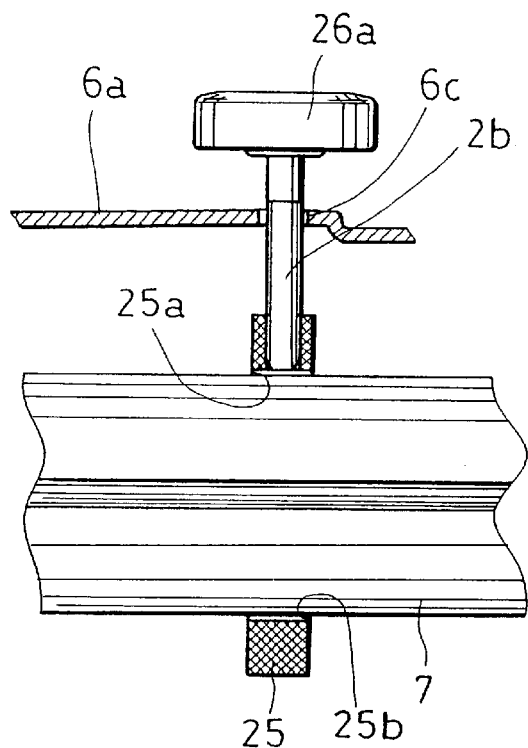
FIG. 10 is an explanatory side view showing the operation where a lock ring does not engage a slide bar.

As shown in FIGS. 3 to 6, a lock ring 25 is disposed on the slide bar 7 for preventing the slide bar 7 from moving in the horizontal direction relative to the cylindrical casing 6a of the slide support device 6. The lock ring 25 is positioned between the ball bearings 6b and has an inner diameter that is slightly greater than the outer diameter of the slide bar 7. Therefore, the lock ring 25 does not interfere with the slide bar 7 when the central axis of the lock ring 25 is positioned substantially on the axis of the slide bar 7 as shown in FIG. 10.

As shown in FIGS. 4 and 6, a fixing screw 26 is inserted into an insertion hole 6c formed in the casing 6a and is screwed into the lock ring 25 in the diametrical direction. A knob 26a is fixedly mounted on the head of the fixing screw 26, so that the operator can advance and withdraw the fixing screw 26 by rotating the knob 26a. Thus, when the operator advances the screw 26 into the lock ring 25 by rotating the knob 26a, the lower end of the screw 26 abuts the outer surface of the slide bar 7. As the operator further advances the screw 26, the lock ring 25 is pulled up, so that the lower side of the inner surface of the lock ring 25 is pressed against the slide bar 7 in surface-to-surface contact relationship therewith. Therefore, the slide bar 7 cannot be moved in either of the forward and rearward directions relative to the casing 6a of the slide support device 6. As a result, the saw unit 10 cannot be slidably moved relative to the turntable 3. Thus, the lock ring 25 serves as a manually operable lock means. When the operator withdraws the screw 26, the slide bar 7 can be slidably moved relative to the casing 6a, so that the saw unit 10 can be slidably moved relative to the turntable 3 in both the forward and rearward directions.

The insertion hole 6c for inserting the fixing screw 26 has a diameter that is slightly greater than the diameter of the screw 26. Therefore, the screw 26 can be tilted by pushing the upper end of the screw 26 or the knob 26a in the forward or rearward direction. As a result, the inner surface of the lock ring 25 is pressed against or interferes with the slide bar 7 as will be hereinafter explained.

Figure 11:
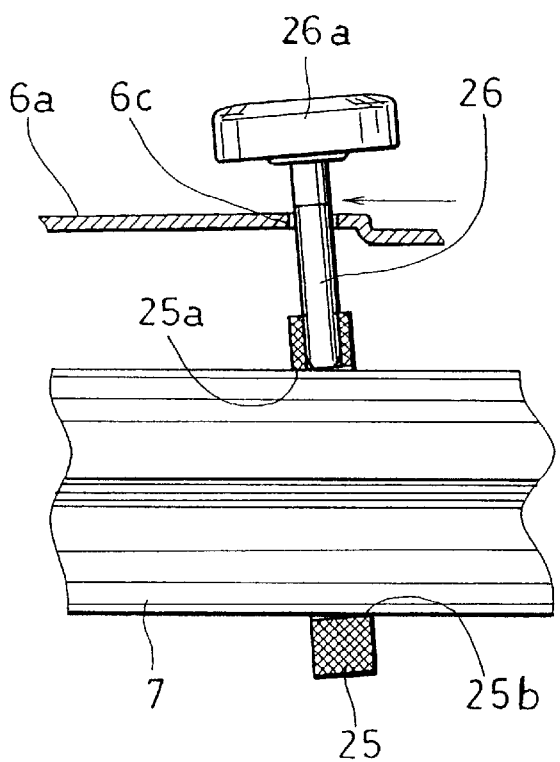
FIG. 11 is an explanatory side view similar to FIG. 10 but showing the operation where the lock ring is inclined to engage the slide bar.

When the knob 26a is pushed rearward with the screw 26 slightly withdrawn, the fixing screw 26 as well as the lock ring 25 are tilted leftward. Therefore, the lock ring 25 is pressed against the slide bar 7 as shown in FIG. 11. More specifically, a rear upper part 25a and a front lower part 25b of the inner surface of the lock ring 25 are pressed on the outer surface of the slide bar 7. In this state, the slide bar 7 is prevented from moving forward (rightward as viewed in FIG. 11) but is permitted to move rearward.

Thus, when a force is applied to the slide bar 7 to move the same forward, this force urges the lock ring 25 to further pivot leftward. However, the lock ring 25 will not pivot because of interference between the slide bar 7 and the front upper part 25b of the inner surface of the lock ring 25. In addition, because a relatively large force is applied rearwardly to the knob 26a, the lock ring 25 as well as the screw 26 will not move with the slide bar 7. Further, even if the lock ring 25 is moved with the slide bar 7 against the force applied to the knob 26a, such movement will be stopped when the screw 26 abuts the front periphery of the insertion opening 6c. As a result, the slide bar 7 is prevented from moving in the forward direction. On the other hand, when a force is applied to the slide bar 7 to move the same rearward, the slide bar 7 can be moved because the lock ring 25 as well as the screw 26 can be easily tilted toward the vertical position.

On the contrary, when the knob 26a is pushed forward, the fixing screw 26 as well as the lock ring 25 are tilted rightward. In this case, the slide bar 7 is prevented from moving in the rearward direction while it is permitted to move in the forward direction. In this embodiment, the above tilting movement of the fixing screw 26 can be caused in response to the downward pivotal movement of the saw unit 10. Therefore, a mechanism for causing such a movement of the fixing screw 26 will now be explained.

Figure 8:
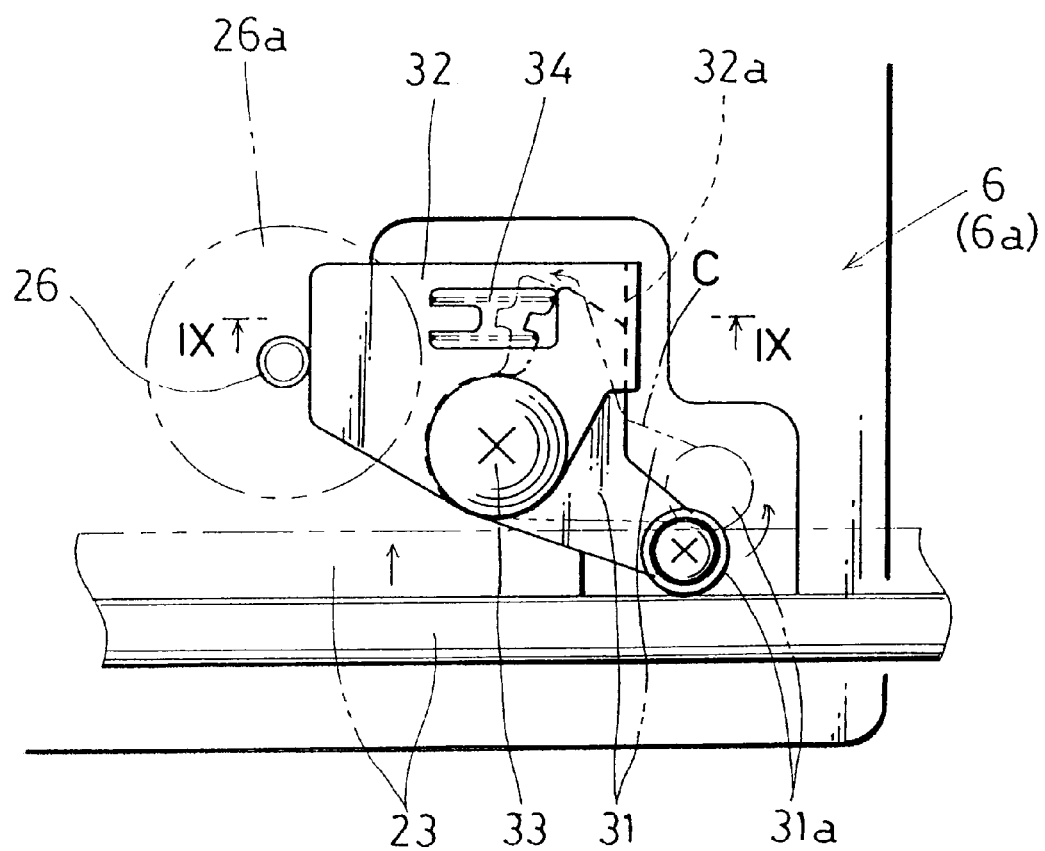
FIG.8 is a plan view of a part of a slide support device and showing the operation of first and second rotary members.
Figure 9:
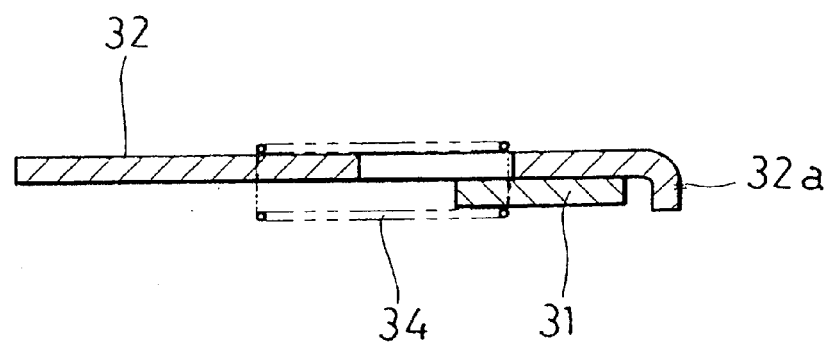
FIG. 9 is a sectional view taken along line IX—IX in FIG. 8.

As shown in FIG. 8, a first rotary plate 31 and a second rotary plate 32 are rotatably mounted on an upper surface of the casing 6a of the slide support device 6 by means of a common support pin 33. The first rotary plate 31 and the second rotary plate 32 can be rotated independently of each other. A compression spring 34 is interposed between the first and second rotary plates 31 and 32, so that the first rotary plate 31 is biased by the compression spring 34 in the clockwise direction relative to the first rotary plate 31. As will be seen from FIG. 9, the first rotary plate 31 is positioned below the second rotary plate 32. In addition, one end of the second rotary plate 32 has a stopper edge 32a that is bent downwardly toward the casing 6a. As shown in FIG. 8, the rotation of the first rotary plate 31 in the clockwise direction is restrained through abutment with the stopper edge 32a.

A pin-like engaging member 31a is mounted on one end of the first rotary plate 31. The engaging member 31a abuts the joint bar 23 as a result of the biasing force of the compression spring 34 described above. Incidentally, the other end of the second rotary plate 32 opposite to the stopper edge 32a is positioned below the knob 26a. This end of the second rotary plate 32 abuts the upper portion of the fixing screw 26, because the second rotary plate 32 is biased by the compression spring 34 in the counterclockwise direction as viewed in FIG. 8.

When the saw unit 10 is held in the uppermost position by the compression spring 9b, the engaging projection 20 does not engage the catch projection 21b. Therefore, the joint bar 23 is pivoted by its weight to the lowermost position as indicated by solid lines in FIG. 8 (rightmost position as viewed in FIG. 5). In this state, the joint bar 23 does not apply any force to the first rotary plate 31 and to the second rotary plate 32. Therefore, the second rotary plate 32 is not pressed against the fixing screw 26, and the fixing screw 26 is held in the vertical position shown in FIG. 11. As a result, the slide bar 7 can be moved in both the forward and rearward directions.

On the other hand, when the operator presses the saw unit 10 downwardly below a predetermined height, the engaging projection 20 engages the catch projection 21b so as to move the same upward. The joint bar 23 is then pivoted upwardly to rotate the first rotary plate 31 in the counterclockwise direction against the biasing force of the compression spring 34 as indicated by dotted lines C in FIG. 8. Therefore, the compression spring 34 is compressed to press the second rotary plate 32 against the fixing screw 26.

As a result, the lock ring 25 as well as the fixing screw 26 are inclined rearward as shown in FIG. 11. When the lock ring 25 is inclined rearward, the slide bar 7 is prevented from moving in the forward direction. Therefore, as described above, the saw unit 10 is prevented from moving in the direction of the operator who is positioned on the front side of the turntable 3. However, the saw unit 10 can still be moved rearward.

Therefore, when a chop cutting operation is using the circular saw 1 of this embodiment in which the saw unit 10 is positioned on the rear side of the turntable 3, the operator is required to apply a pressing force only to the saw unit 10. Thus, the operator is not required to apply an additional pushing force to prevent movement of the saw unit 10 toward the operator. Therefore, the circular saw 1 of this embodiment is improved in operability and reduces the burden on the operator during a chop cutting operation.

In addition, with this embodiment, when the operator manually advances the fixing screw 26 into the lock ring 25, the slide bar 7 is prevented from moving both in the forward and rearward directions. Therefore, the circular saw 1 of this embodiment is improved in operability also in this respect.

Figure 12:
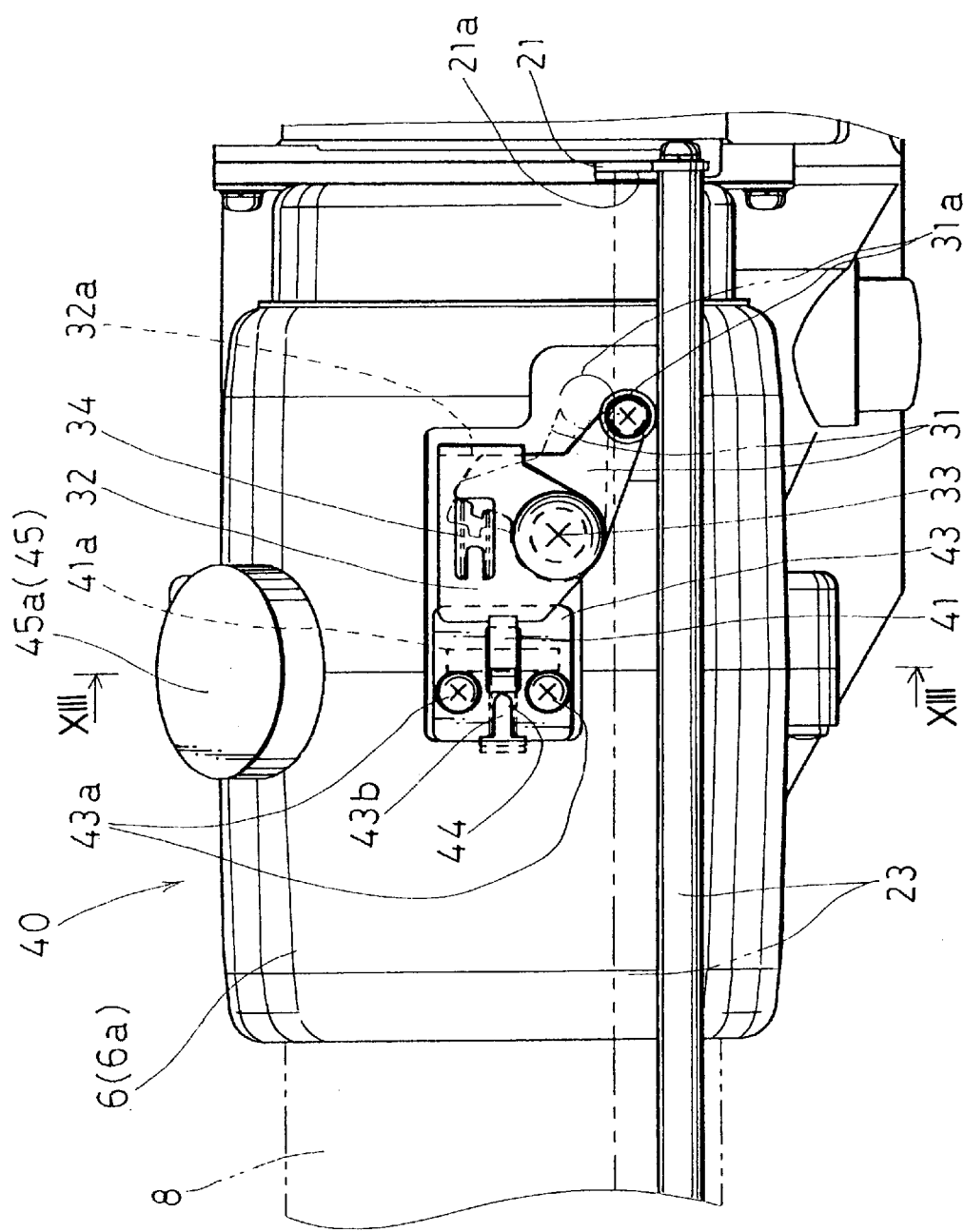
FIG. 12 is a plan view of certain relevant parts of a circular saw according to a second representative embodiment.

The above embodiment can be modified in various way. For example, a second detailed representative embodiment will now be described with reference to FIGS. 12 to 14. A circular saw 40 of this embodiment substitutes a lock plate 41 for the lock ring 25 of the first detailed representative embodiment. Thus, the lock plate 41 is pressed against the slide bar 7 for preventing the saw unit 10 from moving in the forward direction. In the second representative embodiment, like members are given the same reference numerals as the first representative embodiment.

An opening 6d is formed in the same position as the insertion hole 6c of the first preferred embodiment on an upper portion of the casing 6a of the slide support device 6. The lock plate 41 has a substantially rectangular configuration and is pivotally supported within the opening 6d by means of a horizontal support pin 41a. A cover plate 43 is secured to the casing 6a by means of screws 43a so as to close the opening 6d. The cover plate 43 has a rear side that includes a hook-like portion 43b.

Figure 14:
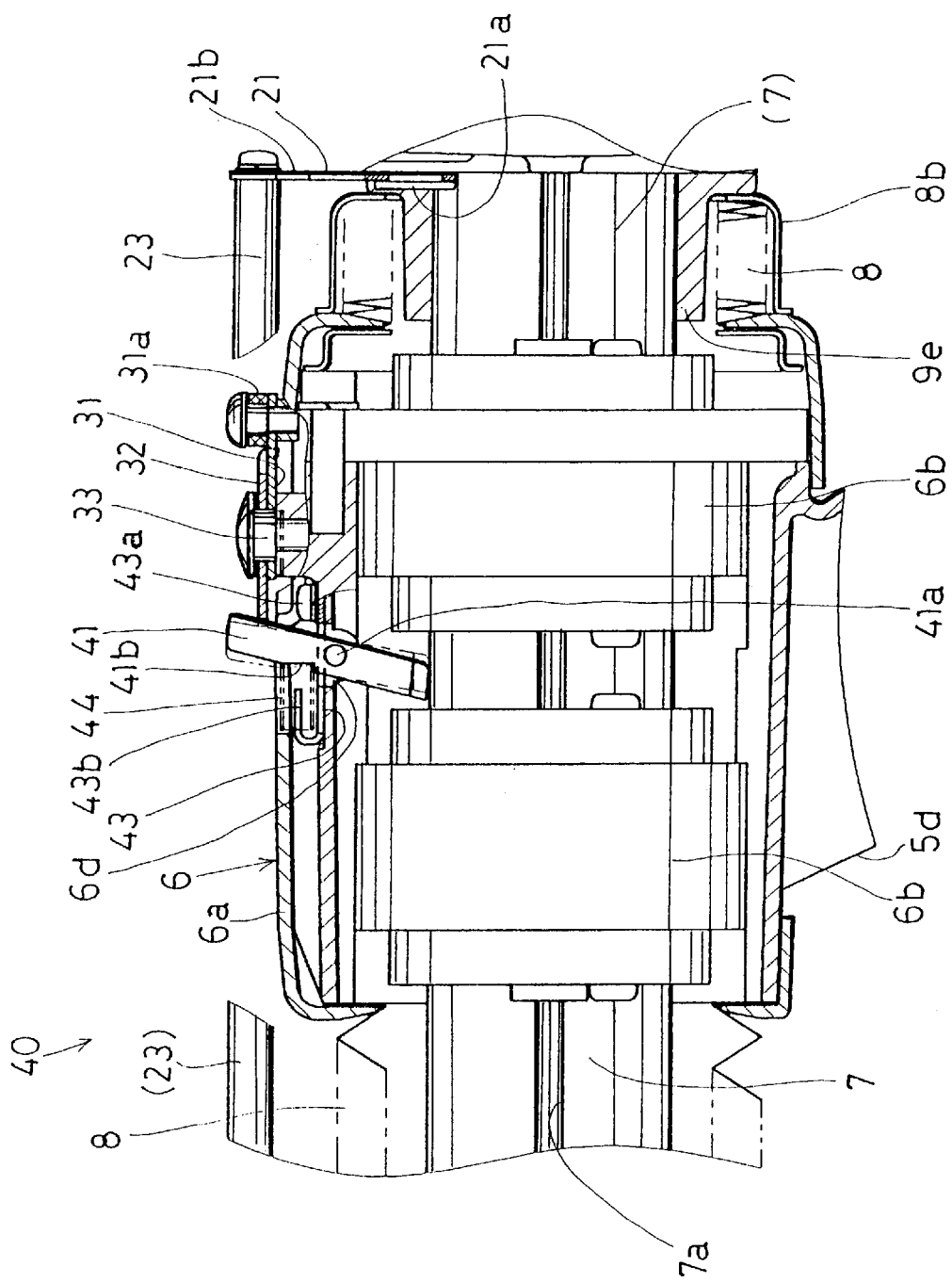
FIG. 14 is a vertical sectional view of a slide support device.

As shown in FIG. 14, the hook-like portion 43b is bent to extend forwardly from the rear end of the cover plate 43. A compression spring 43 is interposed between the hook-like portion 43b and a recessed portion 41b that is formed on the rear surface of the lock plate 41. Therefore, the lock plate 41 is normally biased by the compression spring 43 in such a direction that the upper side of the cover plate 43 pivots forward (clockwise direction as viewed in FIG. 14). The second rotary plate 32 is disposed forward of the lock plate 41 and has the same function as described in connection with the first representative embodiment.

Figure 13:
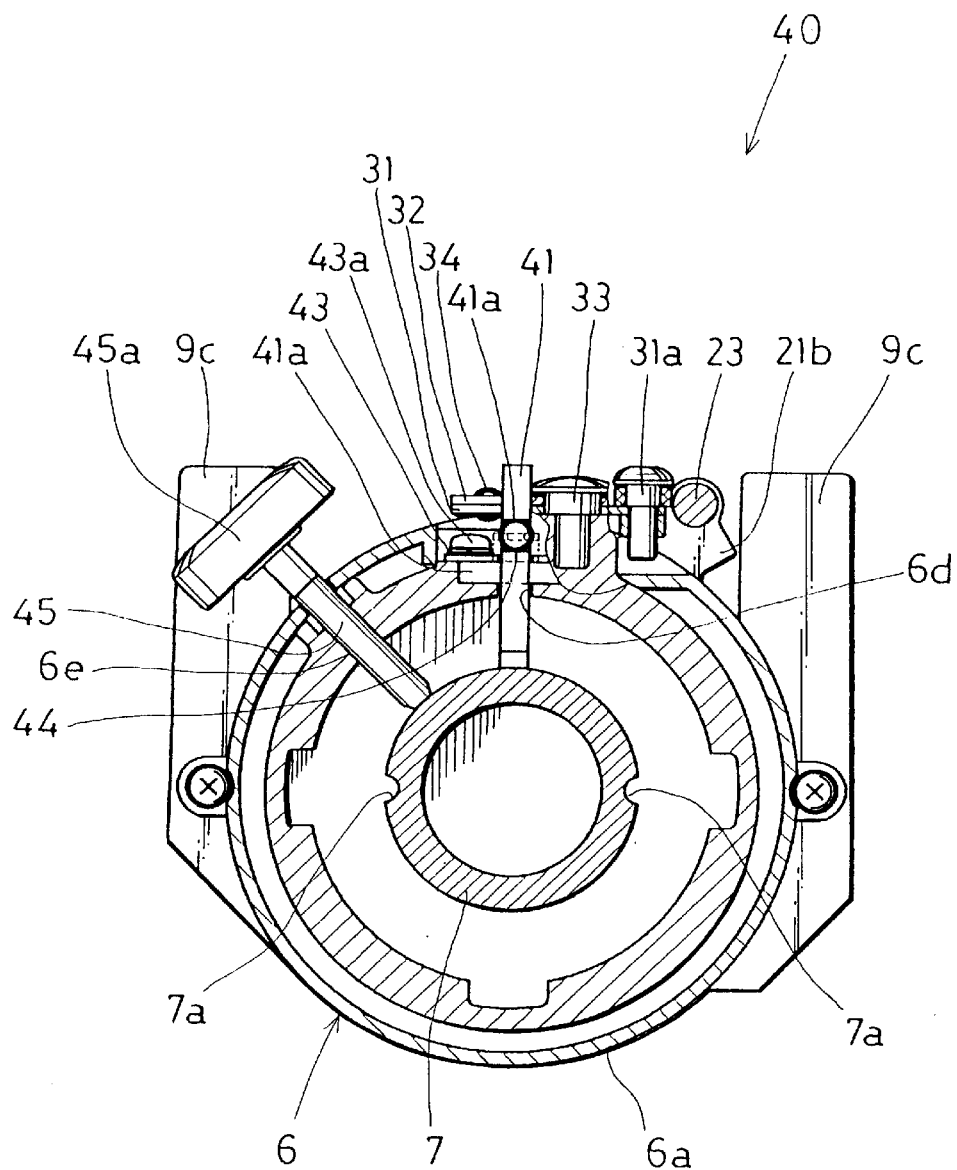
FIG. 13 is a sectional view taken along line XIII—XIII in FIG. 12.

Fixing screw 45 is positioned in a different position from the fixing screw 26 of the first representative embodiment. The fixing screw 45 has a knob 45a mounted on its head. As shown in FIG. 13, the fixing screw 45 of the second representative embodiment is displaced from the lock plate 41 by an 45° angle. A threaded hole 6e is formed in the casing 6a for engagement with the fixing screw 45, so that the screw 45 extends into the casing 6a through the threaded hole 6e. Therefore, when the operator advances the screw 45 into the threaded hole 6e, the lower end of the screw 45 abuts the slide bar 7 as shown in FIG. 13. As a result, the slide bar 7 is prevented from moving in both the forward and rearward directions.

The second representative embodiment has substantially the same function as the first representative embodiment. Thus, when the operator presses the saw unit 10 downwardly below a predetermined height, the engaging projection 20 engages the catch projection 21b to pivot the joint bar 23. The first rotary plate 31 is then rotated to also rotate the second rotary plate 32 against the biasing force of the compression spring 34. The upper portion of the lock plate 41 is subsequently pushed rearward, so that the lock plate 41 pivots in the counterclockwise direction as viewed in FIG. 14. The lower front corner of the lock plate 41 is therefore pressed against the slide bar 7. As a result, the slide bar 7 is prevented from moving in the forward direction. Consequently, the saw unit 10 is prevented from moving in the direction toward the operator.

The second representative embodiment has the same advantages as more fully discussed with respect to the first embodiment, because the operator is not required to apply a pushing force to the saw unit 10 to counteract the reaction force.

In both first and second detailed representative embodiments, the timing of prevention of movement of the saw unit 10 in the forward direction can be easily changed, for example, by changing the position or the height of the engaging projection 20.

Figure 15:
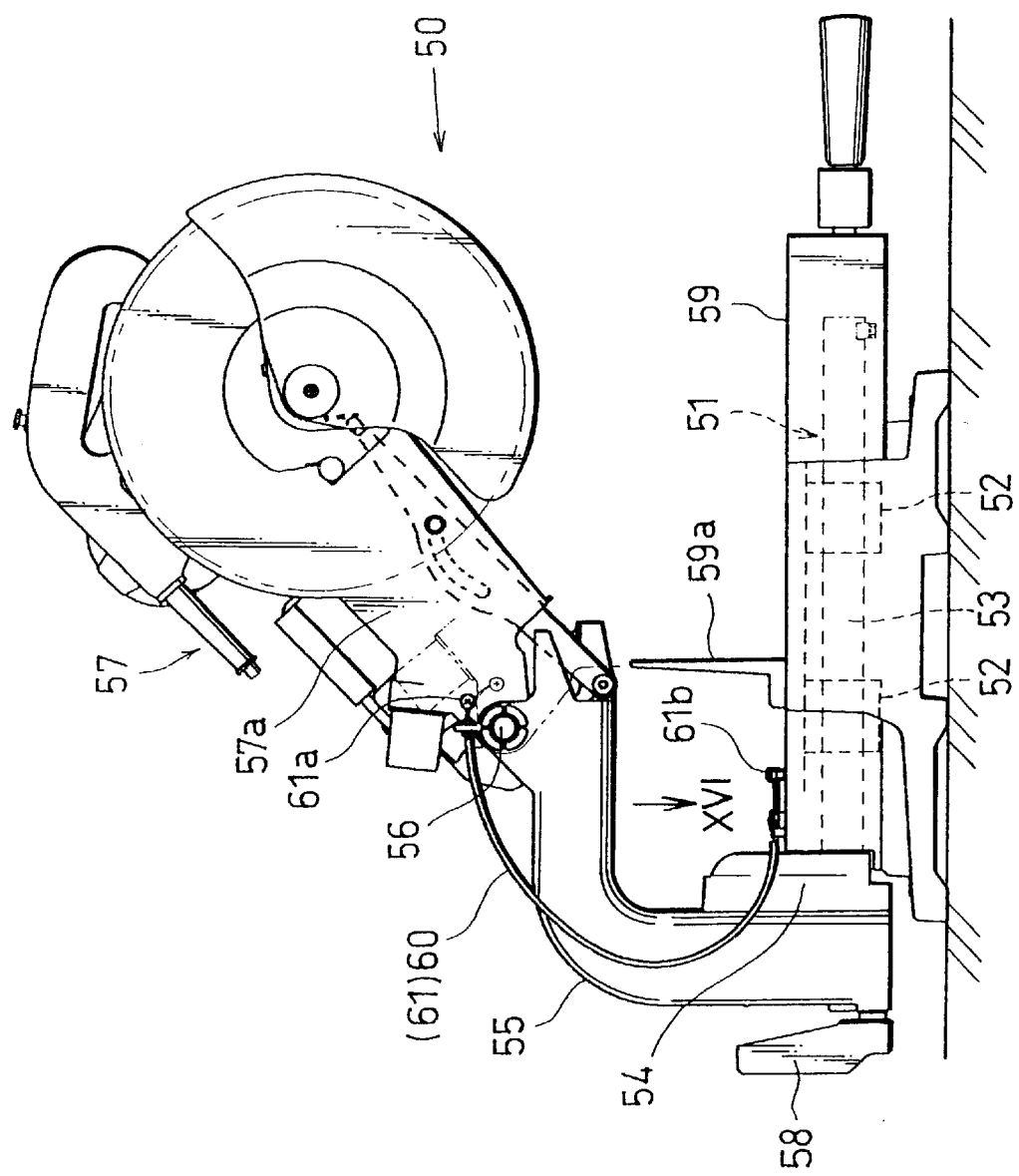
FIG. 15 is a side view of a circular saw according to a third representative embodiment.

In order to further demonstrate the breadth of the present teachings, a third detailed representative embodiment will now be described with reference to FIGS. 15 to 17. Although the first and second detailed representative embodiments relate to the circular saw 1 and 40 in which the slide support device 6 is disposed above the turntable 4, the third detailed representative embodiment relates to a circular saw 50 that has a slide support device 51 disposed below a turntable 59. A fence 59a is again disposed on the turntable 59 for determining the position of a workpiece (not shown in FIGS. 15 to 17).

The slide support device 51 includes a pair of parallel slide bars 53 that are axially slidably supported below the turntable 59 by means of bearings 52, which are mounted on the bottom surface of the turntable 59. A support base 54 is secured to the rear sides of the support base 54, so that the slide bars 53 are slidably movable in unison with each other. A lateral pivotal arm 55 is pivotally mounted on the support base 54.

A saw unit 57 is vertically pivotally mounted on an upper end of the pivotal arm 55 by means of a support pin 56. A lever 58 is operable by the operator for fixing and releasing the pivotal arm 55 relative to the support base 54. Thus, the pivotal arm 55 can be pivoted by releasing the lever 58, so that a miter cut operation can be performed with the saw unit 57 inclined either rightward or leftward.

A wire 61 covered by a wire cover 60 extends between the saw unit 57 and the turntable 59. One end or an upper end of the wire cover 60 is secured to the upper end of the pivotal arm 55 adjacent the support pin 56. On the other hand, the other end or the lower end of the wire cover 60 is secured to the rear part of the upper surface of the turntable 59. The upper end of the wire 61 extends outward from the wire cover 60 and is connected to a rear portion 57a of the saw unit 57 above the support pin 56 as shown in FIG. 15. The lower end of the wire 61 is connected to one end of a first rotary plate 62 as shown in FIG. 16. In this embodiment, each of the upper and lower ends of the wire 61 has an annular fitting 61c secured thereto as shown in FIG. 17. The annular fitting 61c serves to rotatably receive a screw 61b. Therefore, the upper and lower ends of the wire 61 can be rotated relative to the rear portion 57a of the saw unit 57 and the first rotary plate 62, respectively, by means of the annular fittings 61c and the fixing screws 61b.

Figure 16:
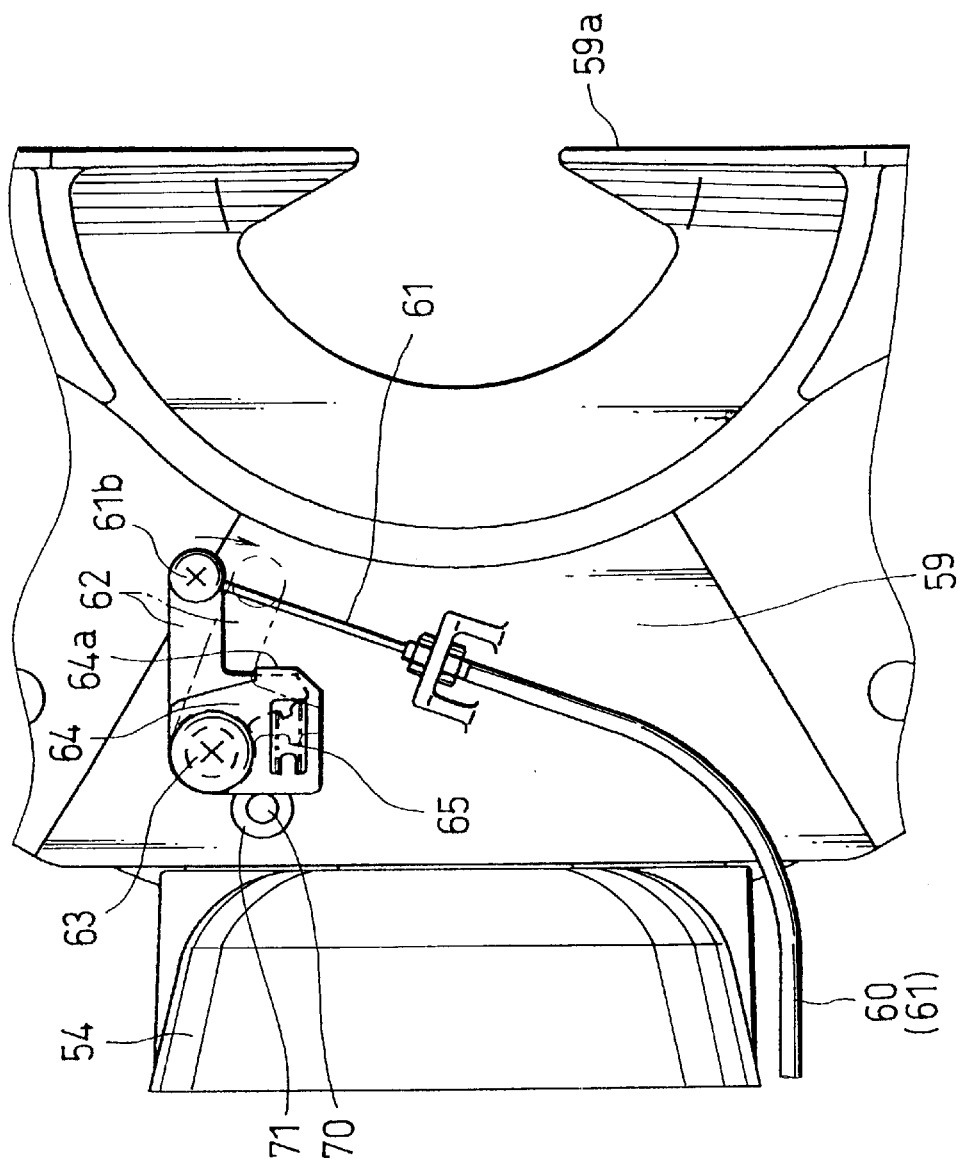
FIG. 16 is an enlarged plan view as viewed in a direction of an arrow XVI in FIG. 15.

As shown in FIG. 16, a second rotary plate 64 as well as the first rotary plate 62 are rotatably mounted on the rear part of the upper surface of the turntable 59 by means of a pin 63. When the operator presses the saw unit 57 to perform a cutting operation, the upper end of the wire 61 is moved to rotate about the support pin 56 in the clockwise direction as viewed in FIG. 1. Therefore, the first rotary plate 62 is pulled to rotate in the clockwise direction as viewed in FIG. 16.

A compression spring 65 is interposed between the first rotary plate 62 and the second rotary plate 64, so that the first rotary plate 62 and the second rotary plate 64 are biased in the counterclockwise direction and the clockwise direction as viewed in FIG. 16, respectively. However, the right end of the second rotary plate 64, as viewed in FIG. 16, has a stopper edge 64 that is bent downward toward the turntable 59. Therefore, the rotation of the first and second rotary plates 62 and 64 in the biased direction is restrained by the stopper edge 64. With this construction, as the first rotary plate 62 rotates in the clockwise direction to compress the compression spring 65, the second rotary plate 61 rotates in the same direction.

Figure 17:
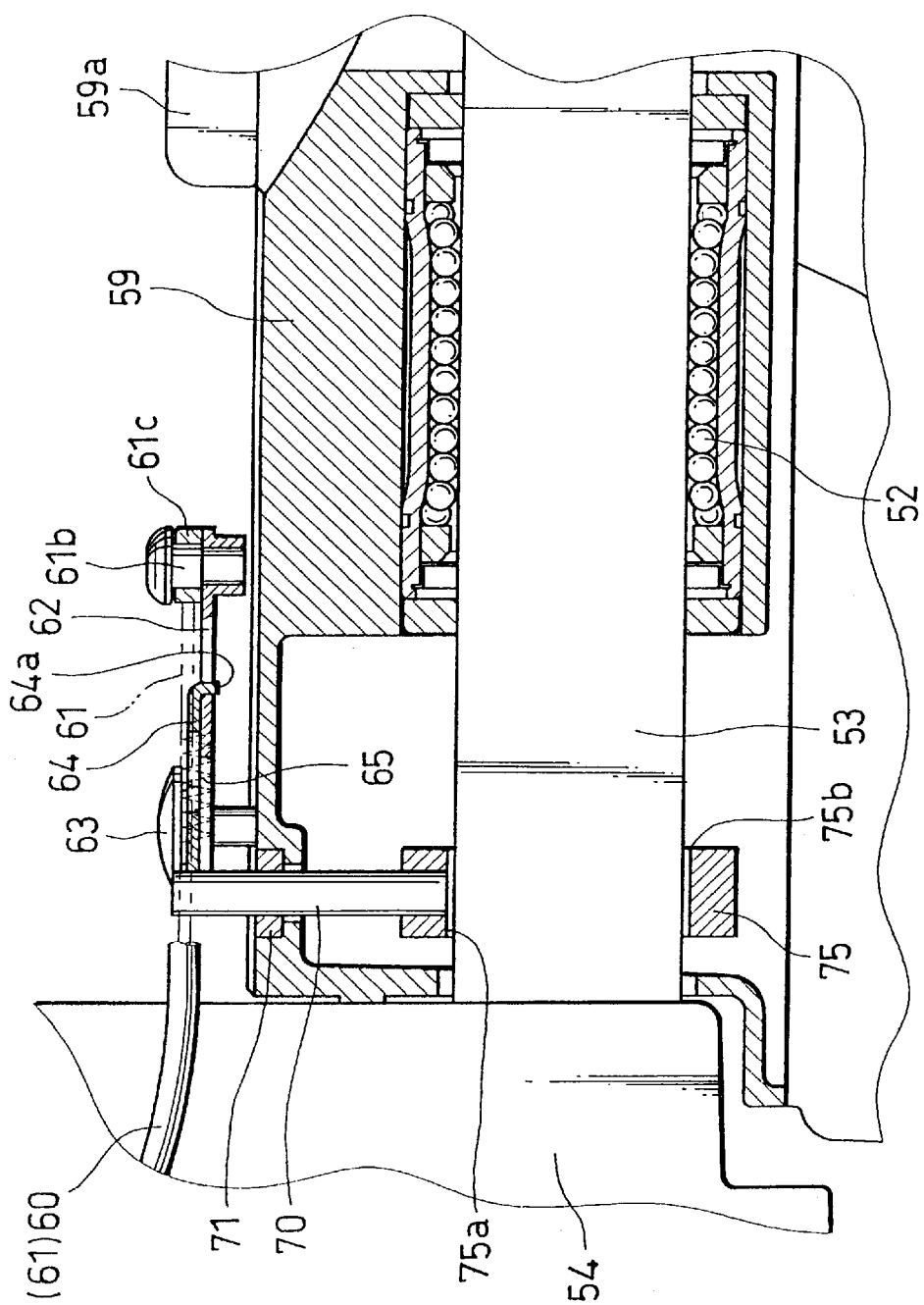
FIG. 17 is a vertical sectional view of a part of a turntable and showing a slide support device and a lock ring.

As shown in FIG. 17, a pin 70 is fixedly inserted into a lock ring 75 in the diametrical direction. The pin 70 extends upwardly through the turntable 59 so as to protrude outwardly therefrom. The pin 70 is normally held in an upright position by means of a bushing 71 made of a resilient material. The bushing 71 is fitted on the pin 70 and is inserted into the turntable 59. When the first rotary member 62 is rotated to rotate the second rotary member 64 in the clockwise direction, the upper end of the pin 70 is pushed rearward (leftward as viewed in FIG. 17), so that the pin 70 is tilted rearward. When the first rotary member 62 returns to rotate in the counterclockwise direction, the biasing force of the compression spring 75 is reduced, so that the pushing force applied from the second rotary member 64 to the pin 70 is also reduced. As a result, the pin 70 returns to the upright position because of the resiliency of the bushing 71.

The lock ring 75 is loosely fitted on the slide bar 53 and has the same function as the lock ring 25 of the first representative embodiment.

Thus, when the pin 70 is in the upright position shown in FIG. 17, the central axis of the lock ring 75 is positioned substantially on the axis of the slide bar 53. In this position, the pin 70 does not interfere with the slide bar 53, so that the slide bar 53 can move in both the forward and rearward directions.

On the other hand, when the pin 70 is tilted rearwardly, the same operation as described in connection with the first representative embodiment with reference to FIG. 11 can be performed. Thus, a rear upper part 75a and a front lower part 75b of the inner surface of the lock ring 25 are pressed against the slide bar 53, so that the slide bar 53 is prevented from moving forward.

Therefore, when the operator presses the saw unit 57 downwardly below a predetermined height, the saw unit 57 can be automatically prevented to move in the forward direction. Thus, the operator is not required to apply an additional pushing force to prevent movement of the saw unit 57 forward toward the operator. Therefore, the circular saw 50 of this third representative embodiment also is improved in operability, like the first and second representative embodiments.

The above representative embodiments may be further modified in various ways. For example, the downward pivoted position of the saw unit 10 (or 57) may be detected by a sensor, such as a proximity sensor or a photoelectric sensor. The sensor may generate an output signal when the saw unit 10 (or 57) has been pivoted below a predetermined height. Based on the output signal from the sensor, an actuator, such as a solenoid, may be actuated to move the fixing screw 26, the lock plate 41 or the pin 70 to prevent the slide bar 7 or the slide bars 53 from moving in the forward direction. This construction enables the performance of the same function as the first to third preferred embodiments. In addition, the pivotal members 21 and 22, the joint bar 23, the first and second rotary plates 31 and 32 or 62 and 64 or the wire 61 as required in the above embodiments can be eliminated. Therefore, the design of the slide support device 6 (or 51) can be simplified.

While the invention has been described with reference to preferred embodiments thereof, it is to be understood that modifications or variations may be easily made without departing from the spirit of this invention.

What is claimed is:

1. A circular saw comprising:
   a table for placing a workpiece thereon;
   a saw unit having a circular saw blade mounted thereon;
   support means for supporting said saw unit on said table so that said saw unit is movable in forward and rearward directions; and,
   lock means including a lock member that is movable between a first position and a second position, said lock member in said first position permitting said saw unit to move in both forward and rearward directions, and said lock member in said second position preventing said saw unit from moving in one of the forward and rearward directions while permitting movement in one of the forward and rearward directions.

2. The circular saw of claim 1 wherein said lock member prevents the saw unit from moving toward an operator when in said second position.

3. A circular saw comprising:
   a table for placing a workpiece thereon;
   a saw unit having a circular saw blade mounted thereon;
   support means for supporting said saw unit on said table so that said saw unit is movable in forward and rearward directions; and,
   lock means including a lock member that is movable between a first position and a second position, said lock member in said first position permitting said saw unit to move in both forward and rearward directions, and said lock member in said second position preventing said saw unit from moving in one of the foward and reaward directions while permitting movement of said saw unit.

4. The circular saw of claim 3 wherein said lock member is held in said first position until said saw unit is moved downwardly from an uppermost position to a predetermined height, and wherein said lock member is moved from said first position to said second position when said saw unit is moved downwardly below the predetermined height.

5. The circular saw of claim 3 wherein said lock means further includes a sensor and an actuator, said sensor being operable to detect the downward movement of said saw unit, and said actuator being operable to move said lock member from said first position to said second position based on an output signal generated by said sensor.

6. The circular saw of claim 3 wherein said lock means further includes interlocking means for transmitting the downward movement of said saw unit to said lock member as the movement from said first position to said second position.

7. The circular saw of claim 6 wherein said support means comprises:
   a slide bar;
   a slide support device for supporting said slide bar, so that said slide bar is slidable in both forward and rearward directions; and,
   a pivotal support device on said slide bar for pivotally supporting said saw unit for movement in a vertical direction; p1 said lock member being pivotable about a pivotal axis and having an abutting surface;
   said abutting surface being substantially spaced apart from said slide bar when said lock member is in said first position; and,
   said abutting surface abutting said slide bar at a position forward or rearward from said pivotal axis when said lock member is in said second position.

8. The circular saw of claim 7 wherein said lock member comprises a ring having an inner surface that has a diameter greater than an outer diameter of said slide bar, said pivotal axis being positioned substantially on an axis of said slide bar, and said abutting surface includes front and rear ends of the inner surface of said ring.

9. The circular saw of claim 8 further including an operation member operable by an operator for moving said ring to a third position in which said inner surface abuts said slide bar in surface-to-surface contact relationship therewith so as to prevent said slide bar from moving in both forward and rearward directions.

10. The circular saw of claim 6 wherein said lock member comprises a substantially rectangular lock strip that is pivotally mounted on said slide support device.

11. The circular saw of claim 5 wherein:
    said support means further includes a support arm that is mounted on said table so as to extend upwardly from said table;
    said saw unit is vertically pivotally mounted on one end of said slide bar by means of said pivotal support device; and
    said interlocking means includes:
    an engaging member movable with said saw unit;
    a pivotal member mounted on said slide support device and pivotal about a first axis that is parallel to the axis of said slide bar; and
    a rotary member mounted on said slide support device and rotatable about a second axis that is substantially perpendicular to the axis of said slide bar;
    whereby the movement of said engaging member in the downward direction is translated into the pivotal movement of said pivotal member and is subsequently translated into the rotational movement of said rotary member, which rotational movement is transmitted to said lock member.

12. The circular saw of claim 6 wherein:
    said slide support device is disposed below said table;
    said pivotal support device includes a support arm that extends upward from one end of said slide bar;
    said saw unit is vertically pivotally mounted on one end of said support arm by means of said pivotal support device; and
    said interlocking means includes:
    a rotary member mounted on said slide support device and rotatable about an axis that is substantially perpendicular to the axis of said slide bar; and
    a wire connecting said rotary member to said saw unit
    whereby the movement of said saw unit is transmitted to said rotary member by means of said wire and is then transmitted to said lock member.

13. An apparatus comprising:
    a circular saw blade coupled to a workpiece cutting surface, the circular saw being movable in directions toward and away from an operator when the circular saw blade is above a predetermined position; and, means for preventing the circular saw blade from moving in one direction either towards or away from the operator while permitting the circular saw blade to move in a second direction toward or away from the operator when the circular saw blade is below the predetermined position, said movement prevention means being coupled to the circular saw blade and coupled to the workpiece cutting surface.

* * * * *